(12) United States Patent
Doll et al.

(10) Patent No.: US 9,163,848 B2
(45) Date of Patent: Oct. 20, 2015

(54) AIR VENT

(71) Applicant: Faurecia Innenraum Systeme GmbH, Hagenbach (DE)

(72) Inventors: Volker Doll, Ranschbach (DE); Stephane Londiche, Montmagny (FR); Julien Seiller, Munich (DE); Martin Schulz, Karlsruhe (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 0 days.

(21) Appl. No.: 14/257,344

(22) Filed: Apr. 21, 2014

(65) Prior Publication Data

US 2014/0357178 A1   Dec. 4, 2014

(30) Foreign Application Priority Data

May 29, 2013 (DE) .......................... 10 2013 210 053

(51) Int. Cl.
*F24F 7/04* (2006.01)
*F24F 13/072* (2006.01)
*B60H 1/34* (2006.01)

(52) U.S. Cl.
CPC *F24F 7/04* (2013.01); *B60H 1/345* (2013.01); *B60H 1/3414* (2013.01); *F24F 13/072* (2013.01); *B60H 2001/3492* (2013.01)

(58) Field of Classification Search
CPC .. B60H 1/00564; B60H 1/00871; B60H 1/34; B60H 1/3414; B60H 1/345; B60H 2001/00092; B60H 2001/00214; B60H 2001/3478; B60H 2001/3492; F24F 7/04; F24F 13/072; F24F 13/075
USPC .................. 454/143, 152, 153, 154, 155, 284
See application file for complete search history.

(56) References Cited

U.S. PATENT DOCUMENTS 3,101,038 A * 8/1963 Archer .......................... 454/295
4,345,510 A * 8/1982 Sterett ........................... 454/315

(Continued)

FOREIGN PATENT DOCUMENTS

DE      102006032587 A1    1/2008
DE    10 2007 019 602 B3   6/2008
DE      102011003435 A1 *  8/2012  ............... B60H 1/34
FR        2 872 260 A1    12/2005

OTHER PUBLICATIONS

English Machine Translation of DE102011003435A1.*

(Continued)

*Primary Examiner* — Gregory Huson
*Assistant Examiner* — Dana Tighe
(74) *Attorney, Agent, or Firm* — Reising Ethington P.C.

(57) ABSTRACT

The invention relates to an air vent comprising a housing, an air inlet opening, which is located in the axial direction of the housing, and an air outlet opening, which is disposed opposite the air inlet opening, a first air guide surface, which has a first bulge and is disposed in the housing, and a second air guide surface, which has a second bulge and is disposed in the housing, wherein the first bulge points in a first direction and the second bulge points in a second direction, wherein the first direction and the second direction oppose one another and extend perpendicularly to the axial direction, wherein the first air guide surface and the second air guide surface are disposed at a distance from the housing, wherein a first air duct is formed by the housing and the first air guide surface, and wherein a second air duct is formed by the housing and the second air guide surface, wherein the first air duct is designed to convey a first volumetric flow of air—which can flow into the housing through the air inlet opening—to the air outlet opening, wherein the second air duct is designed to convey a second volumetric flow of air—which can flow into the housing through the air inlet opening—to the air outlet opening, comprising a first vane and a second vane, wherein the first vane is movably disposed at the end of the first air guide surface facing the air inlet opening, and wherein the second vane is disposed at the end of the second air guide surface facing the air inlet opening, wherein the movability of the first vane and the second vane is designed such that the ratio of the first volumetric flow to the second volumetric flow can be adjusted by means of the position of the first vane and the second vane.

19 Claims, 3 Drawing Sheets

(56) References Cited

U.S. PATENT DOCUMENTS

| | | | |
|---|---|---|---|
| 7,604,533 B2* | 10/2009 | Ogura et al. | 454/155 |
| 2004/0152412 A1* | 8/2004 | Gehring et al. | 454/153 |
| 2008/0014855 A1 | 1/2008 | Leserre | |
| 2010/0130115 A1* | 5/2010 | Miki | 454/155 |

OTHER PUBLICATIONS

English Machine Translation of DE102011003435A1, Aug. 2012.*

Office Action and English translation for corresponding DE Application No. 102013210053.1, dated Dec. 9, 2013.

* cited by examiner

AIR VENT

BACKGROUND

The invention relates to an air vent.

Various air vents are known from the prior art. DE 10 2006 032587 A1, for example, discloses an air outlet device for vehicles, which comprises—as viewed in a longitudinal or vertical section—an air duct having a first, upper wall region and, facing this, a second, lower wall region, and which is fluidically connected via an air outlet opening to a passenger compartment of the vehicle. Air can be directed into the passenger compartment via the air duct and the air outlet opening. At least one louver-type air guide element is disposed between the two wall regions in the region or the vicinity of the air outlet opening.

SUMMARY OF THE INVENTION

The problem addressed by the invention is that of creating an improved air vent.

The problem addressed by the invention is solved by the features of the one or more embodiments disclosed and/or described herein.

An air vent is provided, which comprises
a housing,
an air inlet opening, which is located in an axial direction of the housing, and an air outlet opening, which is located opposite the air inlet opening,
a first air guide surface, which is located in the housing and has a first bulge, and a second air guide surface, which is located in the housing and has a second bulge, wherein the first bulge faces a first direction and the second bulge faces a second direction, wherein the first direction and the second direction oppose one another and extend perpendicularly to the axial direction, wherein the first air guide surface and the second air guide surface are disposed at a distance from the housing, wherein a first air duct is formed by the housing and the first air guide surface, and wherein a second air duct is formed by the housing and the second air guide surface, wherein the first air duct is designed to convey a first volumetric flow of air—which can flow into the housing through the air inlet opening—to the air outlet opening, wherein the second air duct is designed to convey a second volumetric flow of air—which can flow into the housing through the air inlet opening—to the air outlet opening,
a first vane and a second vane, wherein the first vane is movably disposed at the end of the first air guide surface, which faces the air inlet opening, and wherein the second vane is movably disposed at the end of the second air guide surface, which faces the air inlet opening, wherein the first vane and the second vane are movable, wherein the movability of the first vane and the second vane is designed such that the ratio of the first volumetric flow to the second volumetric flow can be adjusted by means of the position of the first vane and the second vane.

The air vent can be used in highly diverse types of transport means, such as vehicles designed for travel by road, air, water, or rail. Embodiments of the invention could have the advantage that the direction of outward flow of an air stream flowing outwardly through the air vent can be deflected without the vanes used therefor being visible to a user of the air vent. The surface area for any dust deposits that would be visible on the air vent is therefore minimized, which could simplify the external cleaning of the air vent.

Depending on the ratio of the first volumetric flow to the second volumetric flow, it is possible to change the air discharge direction, which can be perceived outside of the air vent, since the first and the second bulge can ensure a defined direction of air flow. It should be noted that, in the event that the first and the second volumetric flow are identical, the air-discharge direction is parallel to the axis of the housing of the air vent.

According to an embodiment of the invention, the arrangement of the first vane on the first air guide surface has a first axial hinge-connection of the first vane to the first air guide surface, wherein, due to the first axial hinge-connection, the first vane can be swivelled about the first hinge-connection relative to the first air guide surface, wherein the arrangement of the second vane on the second air guide surface has a second axial hinge-connection of the second vane to the second air guide surface, wherein, due to the second axial hinge-connection, the second vane can be swivelled about the second hinge-connection relative to the second air guide surface. In each case, the hinge-connection is disposed in the center relative to the first and the second vane, for example.

According to an embodiment of the invention, the inside of the housing has
a third bulge in the region of the first bulge, pointing in the first direction, and/or
a fourth bulge in the region of the second bulge, pointing in the second direction.

This could further increase the directional characteristic of the air flowing out of the air outlet opening, since it is now possible for the third and/or fourth bulge to contribute to the effect of a lamellar nature of the air flow. For example, the third bulge extends parallel to the first bulge and/or the fourth bulge extends parallel to the second bulge.

According to an embodiment of the invention, the first air guide surface and the second air guide surface delimit a third air duct between the first air guide surface and the second air guide surface, wherein the third air duct is designed to convey a third volumetric flow of the air—which can flow into the housing through the air inlet opening—to the air outlet opening, wherein the movability of the first vane and the second vane is designed such that the ratio between a first volumetric flow, a second volumetric flow, and a third volumetric flow can be adjusted by means of the position of the first vane and the second vane. This could have the advantage that the directional effect of the air flow can be amplified, in particular, in the axial direction of the housing. In this case, the air could therefore flow "straight out" in a more uniform manner.

According to an embodiment of the invention, the air vent furthermore comprises an air guide element between the first air guide surface and the second air guide surface, wherein the first air guide surface and the air guide element delimit a third air duct between the first air guide surface and the air guide element, wherein the second air guide surface and the air guide element delimit a fourth air duct between the first air guide surface and the air guide element, wherein the third air duct is designed to convey a third volumetric flow of air—which can flow into the housing through the air inlet opening—to the air outlet opening, wherein the fourth air duct is designed to convey a fourth volumetric flow of air—which can flow into the housing through the air inlet opening—to the air outlet opening, wherein the movability of the first vane and the second vane is designed such that the ratio between a first volumetric flow, a second volumetric flow, a third volumetric flow, and a fourth volumetric flow can be adjusted by means of the position of the first vane and the second vane.

This could have the advantage that, due to the presence of a plurality of air ducts, the directional effect could be amplified in the event the outflowing air is not parallel to the axis of the housing. A plurality of air ducts that extend parallel to one another in particular could prevent the formation of a vortex in the air ducts. The use of the air guide element also makes it possible to accommodate mechanical coupling components in the air guide element, in order to bring about the movement of the first and the second vane via these coupling components by means of an appropriate operating element on the air-outlet side of the housing. Given that the coupling components are accommodated in the air guide element, these coupling components could not affect the flow of air through the housing.

According to an embodiment of the invention, the first vane and the second vane are mechanically connected to one another, wherein, due to the coupling, movement of the first vane brings about a simultaneous movement of the second vane. The first vane and the second vane are oriented parallel to one another, for example.

According to an embodiment of the invention, the first vane and the second vane can be moved between a first and a second position, wherein, in the first position, the first air duct is completely closed by the first vane and, wherein, in the second position, the second air duct is completely closed by the second vane. This could provide support for ensuring that the ratio between the first and the second volumetric flow can be adjusted even more precisely.

For example, the first vane and the second vane can be moved between a first and a second position, wherein the first vane and the second vane each have an extension plane, wherein the housing and the first vane and the second vane are designed such that, in the first position, the first vane bears entirely against an inner wall of the housing as viewed in the extension plane, and, in the second position, the second vane bears entirely against the inner wall of the housing as viewed in the extension plane. Furthermore, the inner wall of the housing has a rectangular shape at the level of the position of the first vane and the second vane, as viewed in the axial direction of the housing, for example.

The rectangular shape could simplify the construction and, therefore, the manufacturing costs of the air vent, since a rectangular shape could be selected for both the inner wall of the housing and for the shape of the first and second vanes. In the first position, the first vane, which bears entirely against the inner wall of the housing, can therefore close the first air duct and therefore reliably define the volumetric flow through the second air duct.

According to an embodiment of the invention, the air vent furthermore comprises an illumination means, wherein the illumination means is disposed between the air outlet opening and the first vane and/or the second vane. This could make it easier to use the air vent in darkness. Since there is no need to dispose vanes—which influence the directional characteristic of the air flow—between the illumination means and the air outlet opening, the light can illuminate the air vent from the inside without obstruction.

According to an embodiment of the invention, the air vent furthermore comprises a set of third vanes, wherein the first vane and the second vane can swivel in a direction lying in a first plane, wherein the third vanes can swivel in a direction lying in a second plane, wherein the first plane and the second plane are perpendicular to one another, wherein, due to the swivellability of the third vanes, the direction of flow of the air that can flow into the housing through the air inlet opening can be adjusted in the second plane. This could have the advantage that the adjustability of the directional effect of the air flow could be expanded to include another direction, namely perpendicularly to the direction that can be defined by the first and the second vane.

According to an embodiment of the invention, the third vanes are disposed between the first and the second vane and the air outlet opening, as viewed in the axial direction of the housing. As an alternative, the third vanes are disposed between the first and the second vanes and the air outlet opening in the first and/or second and/or third and/or fourth air duct, as viewed in the axial direction of the housing.

According to an embodiment of the invention, the air vent furthermore comprises a closing element, wherein the closing element is disposed between the air inlet opening and the first vane and the second vane, wherein the closing element can be moved between an opened position and a closed position, wherein, in the opened position, an air passage between the air inlet opening and the air outlet opening is unblocked and, in the closed position, the air passage between the air inlet opening and the air outlet opening is blocked. It is thereby possible to virtually completely block an air flow through the housing.

The closing element comprises a plurality of plates, for example, wherein the plates are hinge-connected to the housing via a common rotational axis, wherein the closing element can be moved between the opened position and the closed position by rotating the plates about the rotational axis. The rotational axis is disposed on the housing in the center thereof, for example. The inner side of the housing in the region of the plates, and the plates themselves are preferably designed as rectangular counterparts and bear against one another. This variant of the use of a plurality of plates, in particular two plates, could provide the advantage of accommodating the closing element in the housing in a space-saving manner.

According to an embodiment of the invention, the air vent furthermore comprises a manipulator on the air outlet opening of the housing. This can have various uses. For example, the manipulator is mechanically coupled via a joint to one end of the first vane, wherein the manipulator can be moved in the first or the second direction, wherein the mechanical coupling between the manipulator and the end of the first vane is designed such that moving the manipulator in the first or the second direction causes the first vane to move.

In a further example, the manipulator is coupled to the third vanes by means of a toothed rack, which is rigidly coupled to the manipulator, and by means of a gearwheel, which engages in the toothed rack, wherein the mechanical coupling between the manipulator and the third vanes is designed such that movement of the manipulator in the direction that is perpendicular to the first direction and lies in a second plane causes the third vanes to swivel.

It is understood that the above-described embodiments can be combined with one another in any manner, provided the combinations do not cancel each other out.

BRIEF DESCRIPTION OF THE DRAWINGS

Preferred embodiments of the invention are explained in the following in greater detail by reference to the drawings.

In the drawings.

DETAILED DESCRIPTION OF THE INVENTION

Elements that are similar to one another are labelled with the same reference signs in the following.

Figure 1:
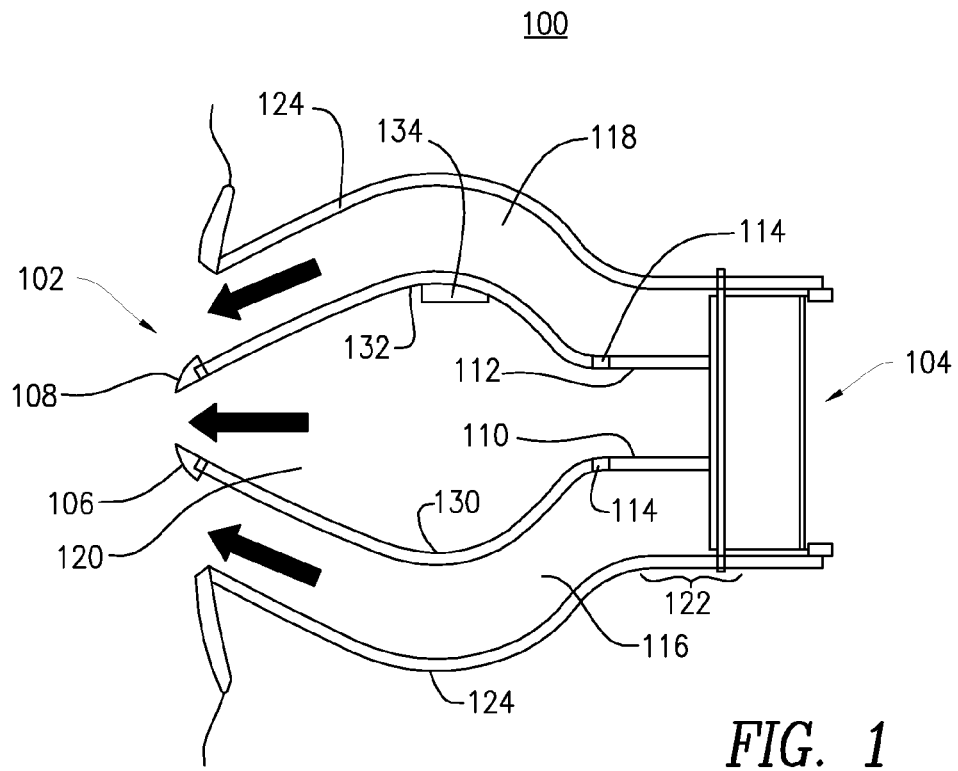
FIG. 1 shows a schematic view of an air vent.

FIG. 1 shows a schematic view of an air vent 100 comprising a housing 124. The air vent has an air inlet opening 104, which is disposed in the axial direction of the housing, and a corresponding air outlet opening 102. The air inlet opening 104 and the air outlet opening 102 are disposed opposite one another as viewed in the axial direction of the housing 124.

Air guide surfaces 106 and 108, which are located in the housing 124, are also clearly shown. Both air guide surfaces 106 and 108 have rounded bulges 130 and 132, respectively, which point in opposite directions, namely vertically upward and downward in FIG. 1. These two directions are opposed to one another and extend perpendicularly to the axial direction of the housing 124. The air guide surfaces 106 and 108 are disposed at a distance from the inner side of the housing 124, thereby forming an air duct 116 between the air guide surface 106 and the interior of the housing 124 and, analogously, an air conduit 118 is formed between the air guide surface 108 and the interior of the housing 124. The inner side of the housing 124 extends parallel to the shape of the air guide surfaces 106 and 108.

A further air duct 120 is formed between the air guide surfaces 106 and 108. If air then flows into the housing 124 from the air inlet opening 104, this air will then flow through the air ducts 116, 118 and 120, as indicated by the directions of the arrows in FIG. 1, and will emerge from the air outlet opening 102. The emerging volumetric flows will mix in a corresponding manner, and therefore the air flow felt at the air outlet opening 102 will be perceived as an air flow that is directed straight ahead.

In order to change the direction of this emerging air flow in the vertical direction, i.e. to deflect this emerging air flow upwardly or downwardly, a vane 110 or 112 is mounted on the air guide surfaces 106 and 108, respectively, via corresponding axes 114. The vanes 110 and 112 can be swivelled in the direction 200 or opposite the direction 200 by means of the axial hinge-connection thereof; see the example depicted in FIG. 2.

Figure 2:
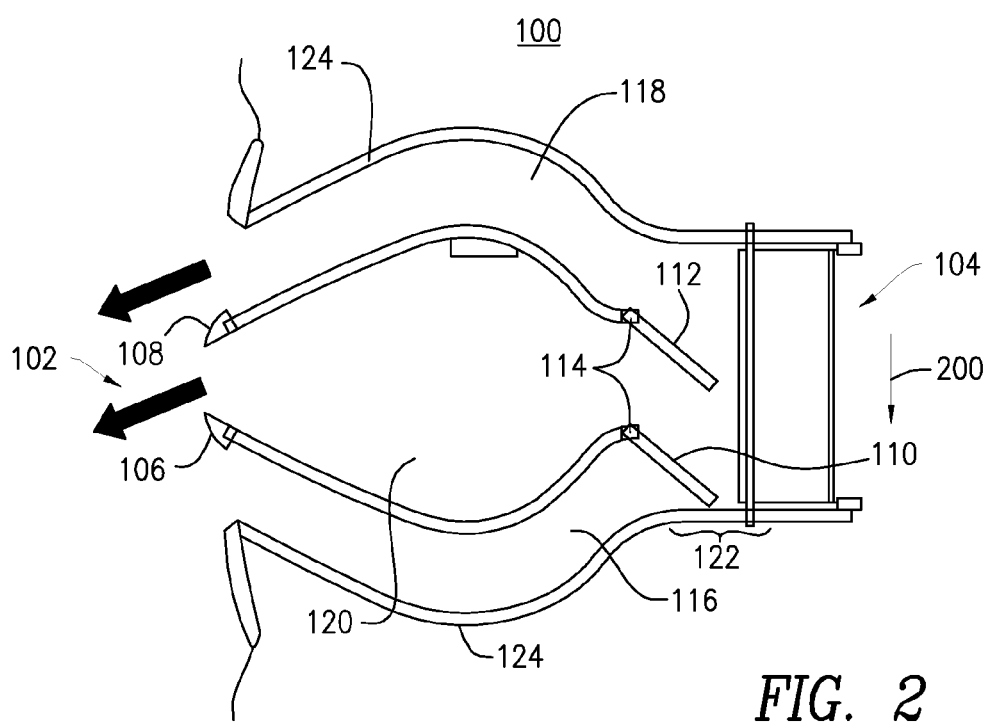
FIG. 2 shows another schematic view of the air vent from FIG. 1.

In FIG. 2, the vanes were swivelled downward about the axis 114 in the direction 200. As a result, the lower air duct 116 was completely closed by the vane 110. The air entering the housing 124 through the air inlet opening 104 can therefore flow only through the air ducts 120 and 118. Due to the bulged shape thereof, and due to the downward slant of the vane 112, the air flow emerging from the air outlet opening is oriented in the downwardly slanted direction.

According to this example, it is therefore possible to control the air flow between various outwardly flowing directions by positioning the vanes 110 and 112 appropriately, without the related air guide components, i.e. the vanes 110 and 112, being visible by an observer from the side of the air outlet opening 102.

This makes it possible, for example, to accommodate an appropriate illumination means 134 within the housing 124, which can provide diffuse illumination of the air vent 100 in darkness. The illumination provided by the illumination means 134 is consistent regardless of the position of the vane 110 or 112, which can make it easier to operate the air vent 100 from the sides of the air outlet opening 102.

The vanes 110 and 112 and the housing 124 have a rectangular shape in the region 122 of the vanes 110 and 112. This makes it possible to easily implement the swivel motion of the vanes without the vanes and the inner walls of the housing 124 interfering with one another.

Figure 3:
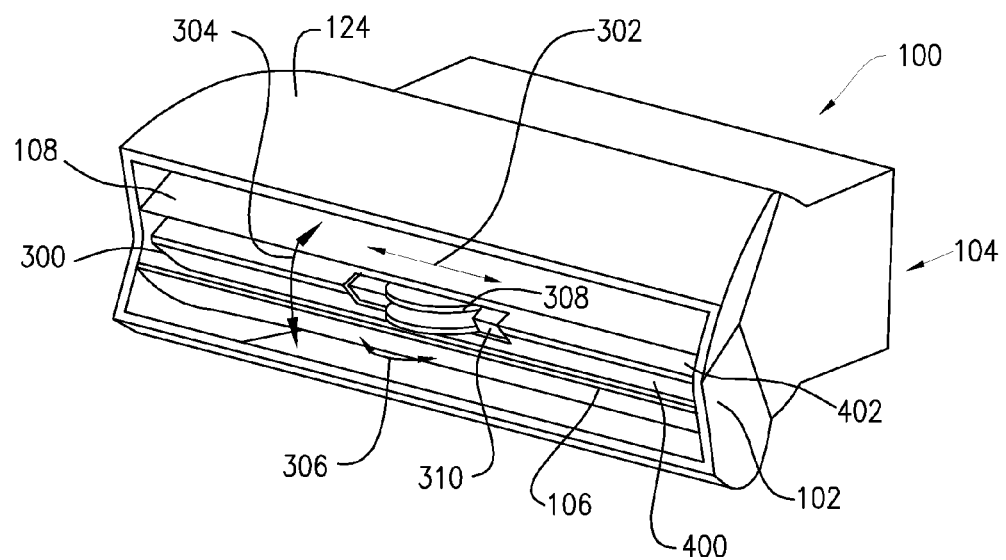
FIG. 3 shows a perspective view of an air vent.
Figure 4:
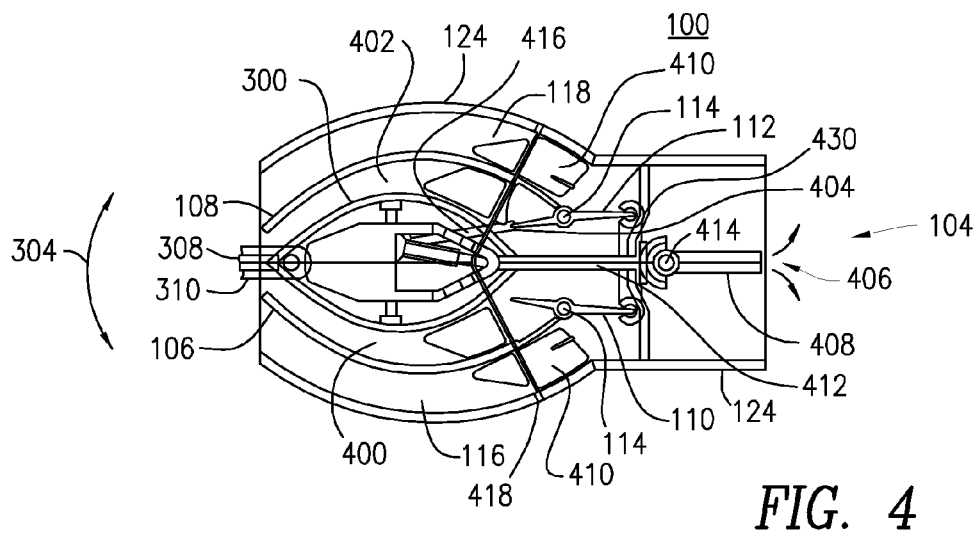
FIG. 4 shows a lateral sectional view of the air vent from FIG. 3.

FIG. 3 shows a further variant of an air vent 100, wherein, as compared to the variant shown in FIGS. 1 and 2, a closed air guide element 300 was selected in this case instead of an air duct between the air guide surfaces 106 and 108. This air guide element, in combination with the air guide surfaces 106 and 108, delimits additional air ducts 400 or 402, as shown in FIG. 4 in particular. Further air ducts 400 and 402 are now provided in addition to the aforementioned air ducts 116 and 118.

FIG. 3 also shows a manipulator 310, which can be swivelled vertically in direction 304 relative to the air guide element 300 rigidly disposed on the housing 124. Furthermore, the manipulator 310 shown in FIG. 3 can be moved in direction 302 horizontally to the left and right relative to the air guide element 300. Finally, the manipulator 310 also comprises a rotatable positioning aid 308, which can be rotated horizontally relative to the manipulator 310 in direction 306.

FIG. 4 shows a lateral sectional view through the air vent 100 depicted in FIG. 3. In addition to the air guide elements 106 and 108, the vanes 110 and 112 known from FIGS. 1 and 2 are shown once more. These, in turn, are disposed on the air guide elements 106 and 108 by means of axes 114, wherein, in the present case, the axes are not disposed at the ends of the vanes 110 or 112, but rather slightly closer to the center relative to the respective vanes, although not necessarily being centered.

One end of the vane 112 is mechanically connected to the manipulator 310, wherein another end of the vane 112, which is diametrically opposed to this end, is mechanically coupled to the vane 110 via the coupling 430. Movement of the manipulator 310 in direction 304 induces a transfer of force between the manipulator 310 and the vane 112, which induces rotation of the vane 112 about the axis 114 thereof due to the coupling between the manipulator 310 and the end of the vane 112. At the same time, the rotation also induces a displacement of the coupling 430 upwardly or downwardly in the vertical direction and, therefore, a corresponding rotation of the vane 110 about the axis 114 thereof. It is thereby possible to adjust a related volumetric flow through the air ducts 116, 400, 402 and 118.

The mechanical coupling between the manipulator 310 and the end of the vane 112 is implemented, for example, via a corresponding coupling rod 416.

FIG. 4 furthermore shows a closing element 408, which is formed of two plates. These plates are supported on the housing 124 via a common axis 414. By means of a rotational motion of the positioning aid 308 in the horizontal direction, a force can be transferred to the plates of the closing element 408 via the coupling rod 412. By means of this force, the plates can be swivelled in the housing 124 opposite to direction 406. By means of this swiveling, the air inlet opening can be completely closed or opened. One of the plates therefore swivels upwardly in the closing procedure, as shown in FIG. 4, while the other plate swivels downwardly, in direction 406, in the closing procedure.

Figure 5:
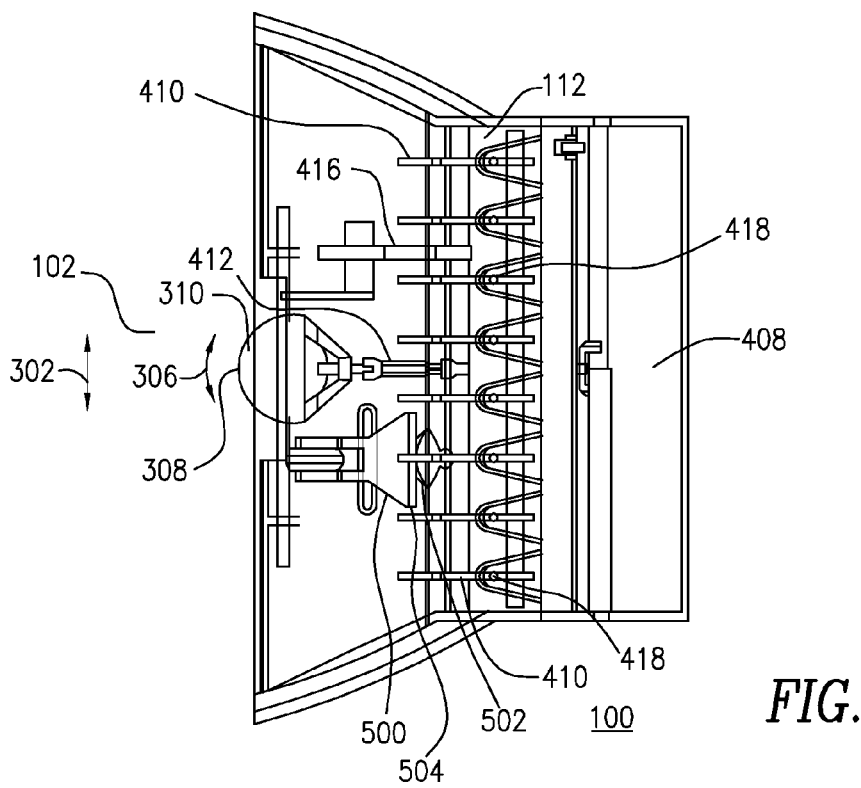
FIG. 5 shows a sectional view of the air vent from FIG. 3, from above.

This procedure and the corresponding mechanical connection are explained in greater detail with reference to FIG. 5. FIG. 5 shows a sectional illustration of the air vent 100 from FIG. 3, from above.

FIG. 5 more clearly shows the positioning aid 308, which can be rotated in direction 306. The rotation occurs relative to the manipulator 310.

Rotation of the positioning aid 308 in direction 306 causes the axis between the positioning aid 306 and the closing element 408 in FIG. 5 to move easily in the horizontal plane. The movement of this axis 412 causes a gearwheel disposed between the axis 412 and the closing element 408 to induce a corresponding rotation of the plates of the closing element 408 about the axis 414. Compensation of the length of the coupling rod 412, which may be required therefor, can be implemented by means of components of the coupling rod 412, which can be slid into one another.

FIG. 4 also shows a set of further vanes 410, which are hinge-connected at an axis 418. The view in FIG. 5 clearly shows that these vanes 410, after rotation about the axis 418, can change the directional characteristic of the air flowing out of the air outlet opening 102. While the vanes 110 and 112, according to FIG. 3, are responsible for a directional characteristic in the vertical direction, the vanes 410 define the directional characteristic of the outflowing air in the horizontal direction.

The orientation of the vanes 410 relative to the housing is induced by the manipulator 310 in that this manipulator is displaced in a translatory manner in the horizontal direction 302. A coupling element 500, which is rigidly connected to the manipulator 310, comprises a toothed rack 504, in which a gearwheel 502 engages. In turn, this toothed rack is rigidly connected to the vanes 410. As a result, when the manipulator 310 moves in direction 302, relative motion between the toothed rack 504 and the gearwheel 502 takes place, which, in turn, induces rotation of the vanes 410 about the axes 418 thereof. It is therefore possible to change the directional characteristic of an emerging air flow in the vertical and horizontal directions by means of a single manipulator.

LIST OF REFERENCE SIGNS

100 air vent
102 air outlet opening
104 air inlet opening
106 air guide element
108 air guide element
110 vane
112 vane
114 axis
116 air duct
118 air duct
120 air duct
122 section
124 housing
130 bulge
132 bulge
134 illumination means
200 direction
300 air guide element
302 direction
304 direction
306 direction
308 positioning aid
310 manipulator
400 air duct
402 air duct
404 connection point
406 direction
408 closing element
410 vane
412 rod
414 axis
416 axis
418 rotational axis
430 coupling
500 force-transmission element
502 gearwheel
504 toothed rack

The invention claimed is:

1. An air vent comprising
   a housing,
   an air inlet opening, which is located in an axial direction of the housing, and an air outlet opening, which is located opposite the air inlet opening,
   a first air guide surface, which is located in the housing and has a first bulge, and a second air guide surface, which is located in the housing and has a second bulge, wherein the first bulge faces a first direction and the second bulge faces a second direction, wherein the first direction and the second direction oppose one another and extend perpendicularly to the axial direction, wherein the first air guide surface and the second air guide surface are disposed at a distance from the housing, wherein a first air duct is formed by the housing and the first air guide surface, and wherein a second air duct is formed by the housing and the second air guide surface, wherein the first air duct is designed to convey a first volumetric flow of air—which can flow into the housing through the air inlet opening—to the air outlet opening, wherein the second air duct is designed to convey a second volumetric flow of air—which can flow into the housing through the air inlet opening—to the air outlet opening,
   a first vane and a second vane, wherein the first vane is movably disposed at an end of the first air guide surface, which faces the air inlet opening, and wherein the second vane is movably disposed at an end of the second air guide surface, which faces the air inlet opening, wherein the first vane and the second vane are movable, wherein the movability of the first vane and the second vane is designed such that the ratio of the first volumetric flow to the second volumetric flow can be adjusted by means of a position of the first vane and the second vane.

2. The air vent according to claim 1, wherein the arrangement of the first vane on the first air guide surface comprises a first axial hinge-connection of the first vane on the first air guide surface, wherein, due to the first axial hinge-connection, the first vane can be swivelled about the first hinge-connection relative to the first air guide surface, wherein the arrangement of the second vane on the second air guide surface comprises a second axial hinge-connection of the second vane on the second air guide surface, wherein, due to the second axial hinge-connection, the second vane can be swivelled about the second hinge-connection relative to the second air guide surface.

3. The air vent according to claim 1, wherein an inner side of the housing
   has a third bulge in the region of the first bulge, pointing in the first direction, and/or
   has a fourth bulge in the region of the second bulge, pointing in the second direction.

4. The air vent according to claim 3, wherein the third bulge extends parallel to the first bulge and/or the fourth bulge extends parallel to the second bulge.

5. The air vent according to claim 1, wherein the first air guide surface and the second air guide surface delimit a third air duct between the first air guide surface and the second air guide surface, wherein the third air duct is designed to convey a third volumetric flow of the air—which can flow into the housing through the air inlet opening—to the air outlet opening, wherein the movability of the first vane and the second vane is designed such that the ratio between the first volumetric flow, the second volumetric flow, and the third volumetric flow can be adjusted by means of the position of the first vane and the second vane.

6. The air vent according to claim 1, furthermore comprising an air guide element between the first air guide surface and the second air guide surface, wherein the first air guide surface and the air guide element delimit a third air duct between the first air guide surface and the air guide element, wherein the second air guide surface and the air guide element delimit a fourth air duct between the second air guide surface and the air guide element, wherein the third air duct is designed to convey a third volumetric flow of air—which can flow into the housing through the air inlet opening—to the air outlet opening, wherein the fourth air duct is designed to convey a fourth volumetric flow of air—which can flow into the housing through the air inlet opening—to the air outlet opening, wherein the movability of the first vane and the second vane is designed such that the ratio between the first volumetric flow, the second volumetric flow, the third volumetric flow, and the fourth volumetric flow can be adjusted by means of the position of the first vane and the second vane.

7. The air vent according to claim 1, wherein the first vane and the second vane are mechanically coupled to one another, wherein, due to the coupling, movement of the first vane induces a simultaneous movement of the second vane.

8. The air vent according to claim 7, wherein the first vane and the second vane are oriented parallel to one another.

9. The air vent according to claim 1, wherein the first vane and the second vane can be moved between a first and a second position, wherein, in the first position, the first air duct is completely closed by the first vane and, wherein, in the second position, the second air duct is completely closed by the second vane.

10. The air vent according to claim 9, wherein the inner wall of the housing has a rectangular shape at the level of the position of the first vane and the second vane, as viewed in the axial direction of the housing.

11. The air vent according to claim 1, wherein the first vane and the second vane can be moved between a first and a second position, wherein the first vane and the second vane each have an extension plane, wherein the housing and the first vane and the second vane are designed such that, in the first position, the first vane bears entirely against an inner wall of the housing as viewed in the extension plane, and, in the second position, the second vane bears entirely against an inner wall of the housing as viewed in the extension plane.

12. The air vent according to claim 1, furthermore comprising an illumination means, wherein the illumination means is disposed between the air outlet opening and the first vane and/or the second vane.

13. The air vent according to claim 1, furthermore comprising a set of third vanes, wherein the first vane and the second vane can swivel in a direction lying in a first plane, wherein the third vanes can swivel in a direction lying in a second plane, wherein the first plane and the second plane are perpendicular to one another, wherein, due to the swivellability of the third vanes, the direction of flow of the air that can flow into the housing through the air inlet opening can be adjusted in the second plane.

14. The air vent according to claim 13, wherein the third vanes are disposed between the first and the second vanes and the air outlet opening as viewed in the axial direction of the housing.

15. The air vent according to claim 13, wherein the third vanes are disposed between the first and the second vanes and the air outlet opening in the first air duct and/or second air duct and/or a third air duct and/or a fourth air duct, as viewed in the axial direction of the housing.

16. The air vent according to claim 13, furthermore comprising a manipulator at the air outlet opening of the housing, wherein the manipulator is coupled to the third vanes by means of a toothed rack, which is rigidly coupled to the manipulator, and by means of a gearwheel, which engages in the toothed rack, wherein a mechanical coupling between the manipulator and the third vanes is designed such that movement of the manipulator in a direction that is perpendicular to a first direction and perpendicular to the axial direction of the housing and lies in a second plane causes the third vanes to swivel.

17. The air vent according to any claim 1, furthermore comprising a closing element, wherein the closing element is disposed between the air inlet opening and the first vane and the second vane, wherein the closing element can be moved between an opened position and a closed position, wherein, in the opened position, an air passage between the air inlet opening and the air outlet opening is unblocked and, in the closed position, the air passage between the air inlet opening and the air outlet opening is blocked.

18. The air vent according to claim 17, wherein the closing element comprises a plurality of plates, wherein the plates are hinge-connected to the housing via a common rotational axis, wherein the closing element can be moved between the opened position and the closed position by rotating the plates about the rotational axis.

19. The air vent according to claim 1, further comprising a manipulator at the air outlet opening of the housing, wherein the manipulator is mechanically coupled to one end of the first vane via a joint, wherein the manipulator can be moved in a first or a second direction, wherein the mechanical coupling between the manipulator and the end of the first vane is designed such that moving the manipulator in the first or the second direction induces the movement of the first vane.

* * * * *